United States Patent [19]

Desmond et al.

[11] Patent Number: 4,948,242

[45] Date of Patent: Aug. 14, 1990

[54] VEHICLE REARVIEW MIRROR ASSEMBLY

[75] Inventors: John P. Desmond; Thomas P. Flynn, both of Newbridge; Thomas D. Gaffney, Bray; James P. Campbell, Drogheda; Parick J. Lawlor, Dublin; John J. McCormack, Newbridge; Molyneux, Keith W., Kildare, all of Ireland

[73] Assignee: Donnelly Mirrors Limited, Ireland

[21] Appl. No.: 325,679

[22] Filed: Mar. 17, 1989

[30] Foreign Application Priority Data

Mar. 22, 1988 [IE] Ireland ................................. 849/88

[51] Int. Cl.⁵ .............................................. G02G 5/08
[52] U.S. Cl. .................................... 350/637; 350/632; 350/280; 350/281
[58] Field of Search ............... 350/601, 631, 632, 637, 350/278, 279, 280, 281

[56] References Cited

U.S. PATENT DOCUMENTS

| | | |
|---|---|---|
| 2,806,408 | 9/1957 | Moeller . |
| 3,059,539 | 10/1962 | Meade . |
| 3,063,342 | 11/1962 | Zeek . |
| 3,064,536 | 11/1962 | Weingartner . |
| 3,075,430 | 1/1963 | Woodward et al. . |
| 3,152,216 | 10/1964 | Woodward . |
| 3,575,496 | 4/1971 | Rochester ............................ 350/289 |
| 3,601,614 | 8/1971 | Platzer, Jr. ............................ 250/209 |
| 3,610,736 | 10/1971 | Bateman ............................ 350/289 |
| 3,612,666 | 10/1971 | Rabinow ............................ 350/279 |
| 3,680,951 | 8/1972 | Jordan et al. ........................ 350/281 |
| 3,746,430 | 7/1973 | Breat et al. ........................ 350/281 |
| 3,783,362 | 1/1974 | Basso et al. ........................ 318/443 |
| 4,050,776 | 9/1977 | Hsu ..................................... 350/289 |
| 4,101,206 | 7/1978 | Oskam et al. ........................ 350/289 |
| 4,171,875 | 10/1979 | Taylor et al. ........................ 350/289 |
| 4,256,375 | 3/1981 | Sharp ................................... 350/289 |
| 4,286,841 | 9/1981 | Deshaw ................................ 350/289 |
| 4,443,057 | 4/1984 | Bauer et al. .......................... 350/281 |
| 4,448,488 | 5/1984 | Nakaho ................................ 350/281 |
| 4,488,777 | 12/1984 | Bauer et al. .......................... 350/279 |
| 4,828,361 | 5/1989 | Alten et al. .......................... 350/279 |
| 4,838,650 | 6/1989 | Stewart et al. ....................... 350/280 |

FOREIGN PATENT DOCUMENTS

| | | |
|---|---|---|
| WO84/01132 | 3/1984 | European Pat. Off. . |
| 1563072 | 1/1966 | Fed. Rep. of Germany . |
| 7319284 | 8/1973 | Fed. Rep. of Germany . |
| 8526206.4 | 2/1978 | Fed. Rep. of Germany . |
| 2640745 | 3/1978 | Fed. Rep. of Germany . |
| 3437775 | 4/1985 | Fed. Rep. of Germany . |
| 52-5129 | 1/1977 | Japan . |
| 59-43248 | 3/1984 | Japan . |
| 59-45235 | 3/1984 | Japan . |
| 60-50048 | 3/1985 | Japan . |
| 1422411 | 1/1976 | United Kingdom . |

*Primary Examiner*—Arnold, Bruce Y.
*Assistant Examiner*—Ryan, Jay Patrick
*Attorney, Agent, or Firm*—Price, Heneveld, Cooper, DeWitt & Litton

[57] ABSTRACT

A day/night vehicle rearview mirror assembly comprises a casing carrying a prismatic mirror, the casing being pivotally mounted on a mounting plate. Preferably, the casing and mirror are driven between a full reflectance position and partial reflectance position by a rack and pinion assembly having interengaging gear teeth extending between a d.c. motor operated drive shaft and a portion of the casing. Alternately, a friction coupling extends between the drive shaft and casing. A noise and vibration reducing coupling are provided in the drive shaft while appropriate glare sensing circuitry and/or switches control operation of the reversible motor and, thus, the reflectance position of the mirror.

41 Claims, 19 Drawing Sheets

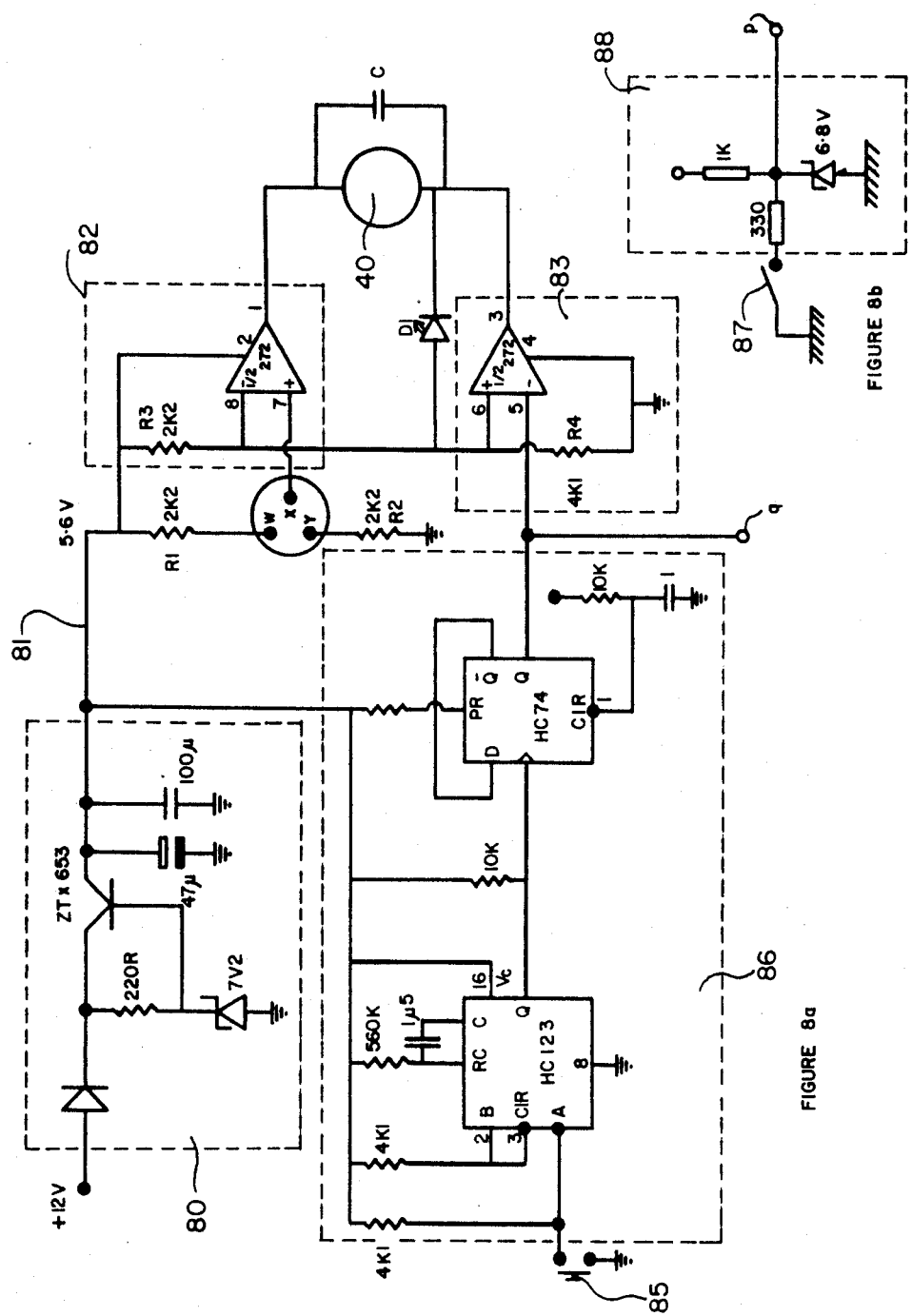

VEHICLE REARVIEW MIRROR ASSEMBLY

BACKGROUND OF THE INVENTION

The present invention relates to a vehicle rearview mirror assembly. In particular, the invention relates to a rearview mirror assembly for selectively positioning a vehicle interior rearview mirror, of the day/night type in either a full reflectance (day) mode or a partial reflectance (night) mode.

A number of day/night type interior rearview mirror assemblies are known. These mirror assemblies generally utilize a prism type reflecting mirror which is adapted to be selectively moved into the day and night reflecting modes. During travel at night, with the rearview mirror in the partial reflectance (night) mode, glare from the headlights of a following vehicle is substantially reduced and is not troublesome to the driver of the vehicle.

However, problems with the known types of day/night interior rearview mirror assemblies include undesirable vibration and noise characteristics, small tolerance limits, high manufacturing cost and are complicated due to a multiplicity of parts.

More specifically, GENTEX European Pat. No. 67,335 describes a rearview assembly in which an eccentric cam and cam follower arrangement is used to move a prism mirror between full and partial reflectance modes. A unidirectional electric motor powered from the vehicle battery is provided as the power source to rotate the eccentric cam. This construction has a number of disadvantages. First, as the eccentric cam is driven only in one direction there is no defined stopping point for the cam and thus accurate positioning of the mirror in either the full reflectance or partial reflectance modes is dependent on the stopping control of the motor. However, since it is known that the voltage output of the vehicle electrical system varies between about 9 to 16 V, then the power output of the motor can vary thus causing over-run or under-run of the eccentric cam resulting in inaccurate positioning of the mirror. In addition, since the eccentric cam and cam follower arrangement have to operate within the vehicle temperature specification range which is usually −40° to +90° C., a substantial variation in frictional resistance between the eccentric cam and cam follower can also result in under-run or over-run of the eccentric cam thus producing inaccurate positioning of the mirror.

Thus, it is an object of the present invention to provide a day/night type rearview mirror assembly, that is selectively positioned in a full reflectance (day) mode or a partial refelctance (night) mode, that is simple in construction and which substantially mitigates the above mentioned problems.

SUMMARY OF THE INVENTION

According to the invention there is provided a vehicle rearview mirror assembly comprising, a casing, a mirror plate fixed on said casing, the mirror plate having a full reflectance mode and a partial reflectance mode, a mounting means disposed within said casing, means pivotally connecting the casing and the mounting means, for pivotal movement of the casing and mirror plate as a unit relative to the mounting means, a rack and pinion actuation means coupling the casing to the mounting means, drive means including electric motor means for operating the actuation means to pivot the casing and mirror plate as a unit, between the full reflectance mode and partial reflectance mode relative to said mounting means.

The reversible d.c. motor is preferably energised by means of a manually operated switch suitably located in the casing or suitably located in the vehicle, for example, on or adjacent to the vehicle steering wheel. Alternatively, the reversible d.c. motor may be energised automatically by a signal supplied from a photosensor circuit which is responsive to light incident on the mirror plate from a following vehicle, or responsive to a signal generated from a photosensor circuit responsive to the relative intensity of the ambient light level and the light level incident on the mirror plate from a following vehicle.

BRIEF DESCRIPTION OF THE DRAWINGS

An embodiment of the invention will now be described, by way of example, with reference to the accompanying drawings, in which:

FIG. 6b is a cross-setional view along the lines III—III in FIG. 6a;

FIGS. 8a and 8b are control circuits for the drive means of FIG. 2;

DESCRIPTION OF THE PREFERRED EMBODIMENTS

Figure 1:
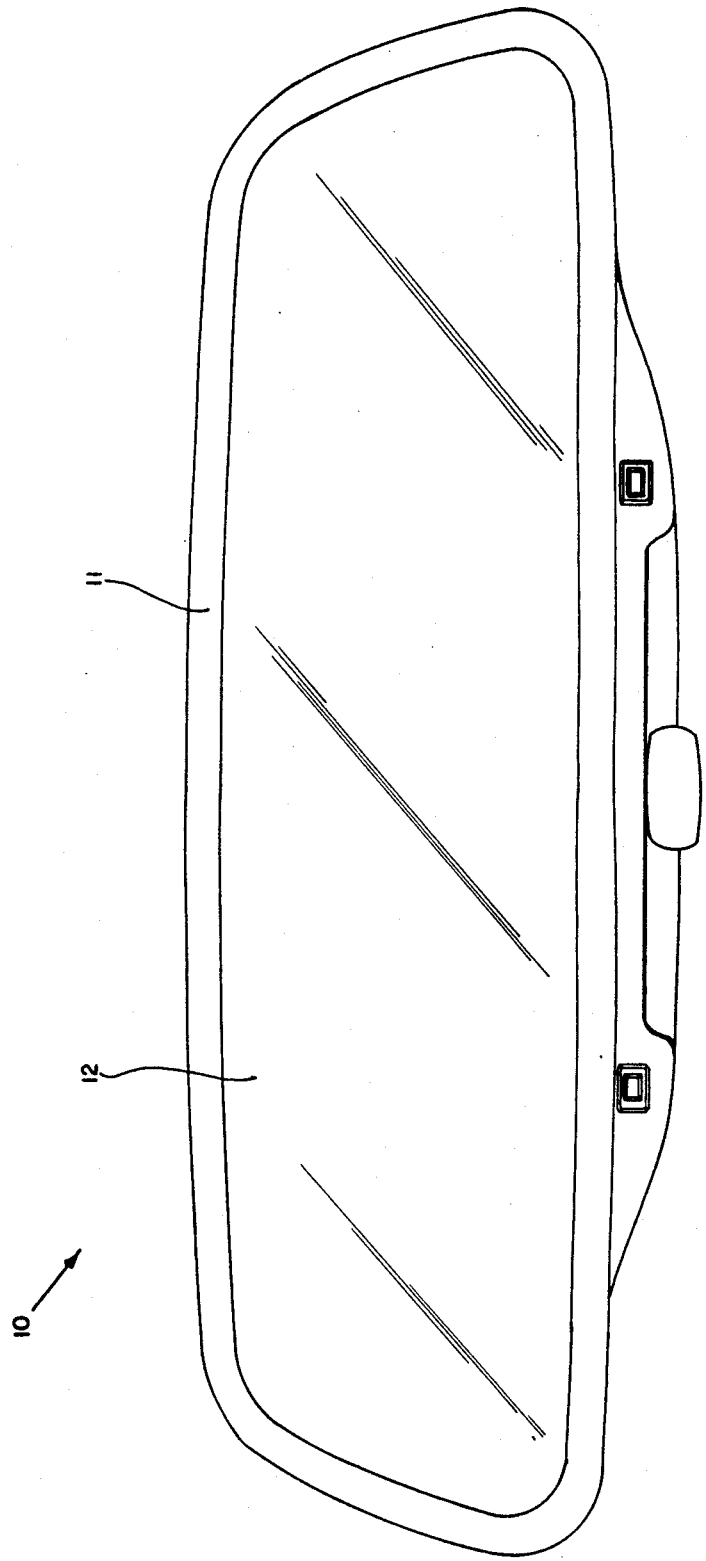
FIG. 1 is a front elevation of a rearview mirror assembly according to the invention.
Figure 2:
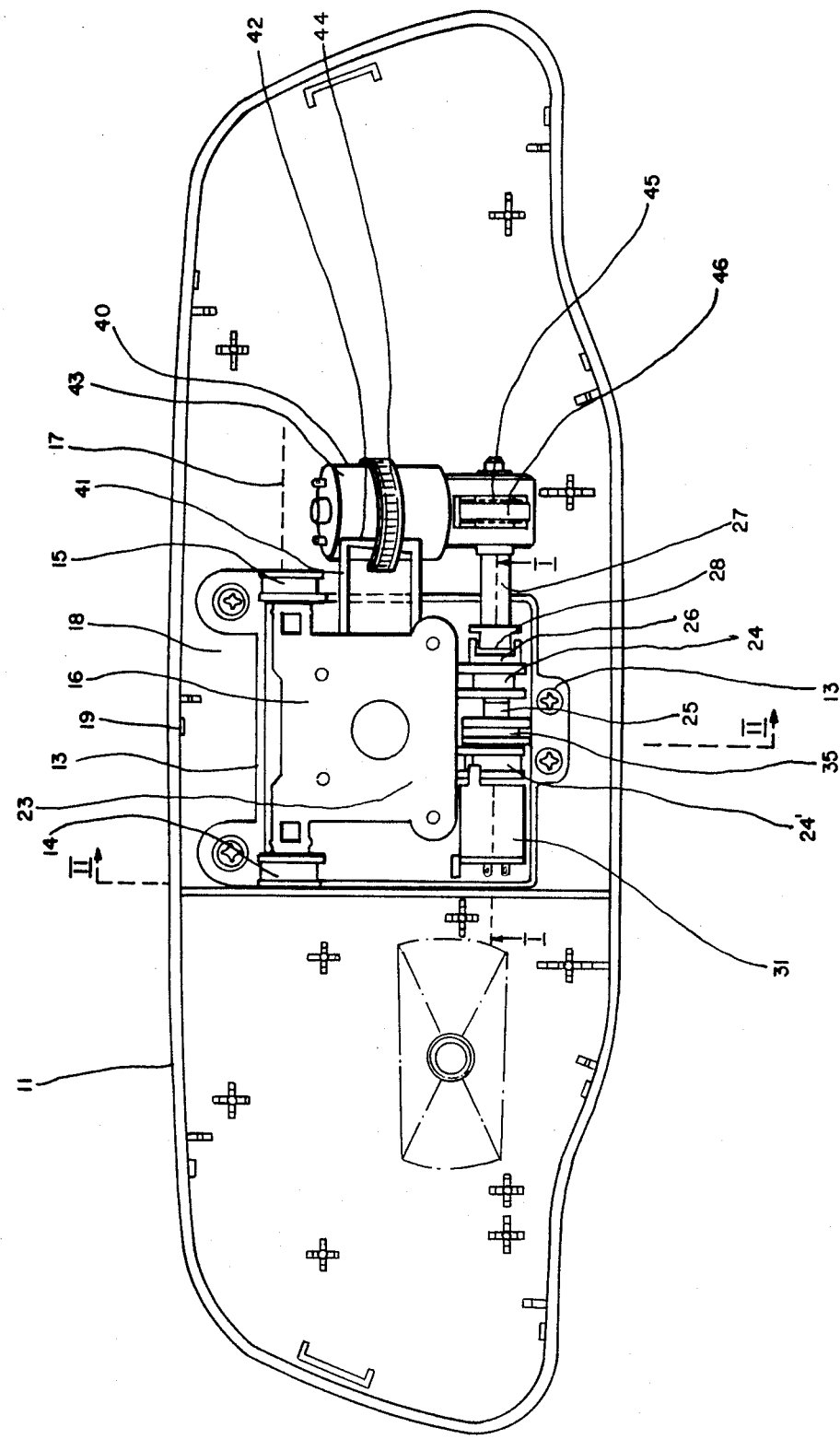
FIG. 2 is a front elevation of the rearview mirror assembly with the mirror plate removed.
Figure 3:
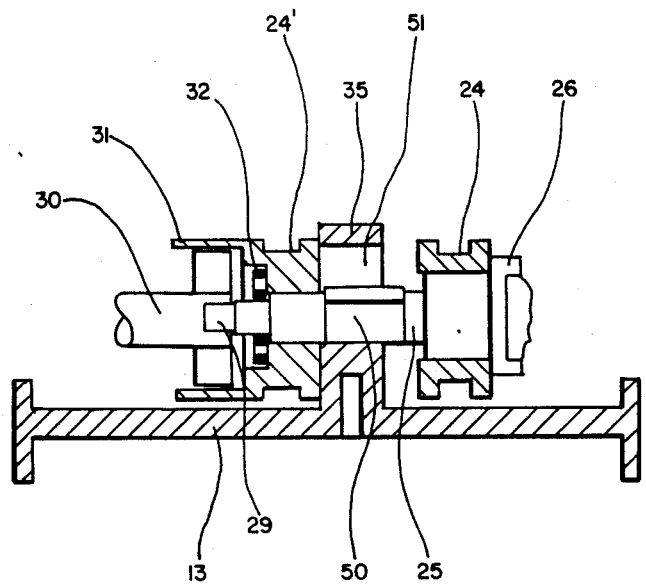
FIG. 3 is a cross-sectional view of the rearview mirror assembly taken along the lines I—I in FIG. 2 and viewed in the direction of the arrows.

Referring now to the drawings wherein similar numerals have been used to indicate like parts, there is shown therein a rearview mirror assembly generally indicated at 10 according to the invention. The mirror assembly 10 comprises a casing 11 which carries a prism type mirror plate 12. The casing 11 is fixed to a support plate 13 which has a pair of spaced apart bearings 14, 15 into which a mounting plate 16 is pivotally engaged. Thus, the casing 11 and support plate 13 can pivot relative to the mounting plate 16 about an axis 17. The support plate 13 is fixed to the inside surface 18 of the rear 19 of the casing 11.

The mounting plate 16 has a spherical socket 20 for receiving the ball part 21 of a conventional mounting arm 22 which is in use fixed to the inside of a motor vehicle (not shown). The rear 19 of the casing 11 and the support plate 13 have suitable apertures to enable the ball part 21 of the mounting arm 22 to be received in the socket 20.

The lower end 23 of the mounting plate 16 has a pair of spaced apart hollow depending lugs 24, 24' which comprise bearings for a cylindrical primary drive shaft 25. It will be noted that the diameter of the bearing 24 is larger than the internal diameter of the bearing 24' corresponding to the diameter of the drive shaft 25 in these regions. One end 26 of the primary drive shaft 25 is connected to a secondary drive shaft 27 by means of a "dog clutch" connection 28. The other end 29 of the primary drive shaft 25 is connected to the operating shaft 30 of a rotary switch 31 as is described in greater detail below. The drive shaft 25 is secured in position relative to the lugs 24, 24' by means of a starlock washer 32 which prevents the drive shaft 25 from sliding towards the right hand side of the apparatus.

The support plate 13 has integrally formed a hollow flange 35 which projects forwardly below the mounting 16 and between the lugs 24, 24'.

Figure 6B:
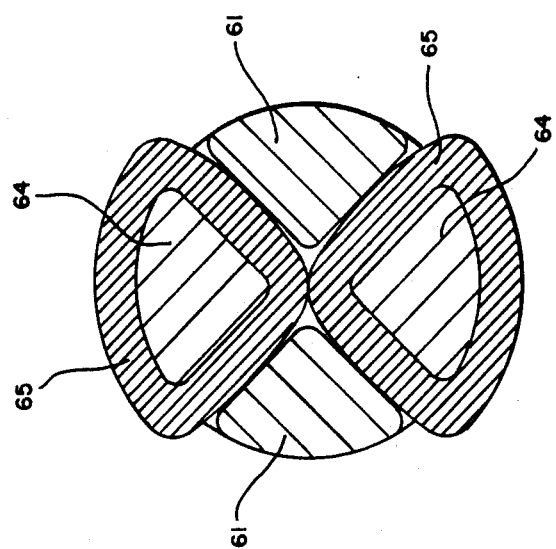
Figure 6A:
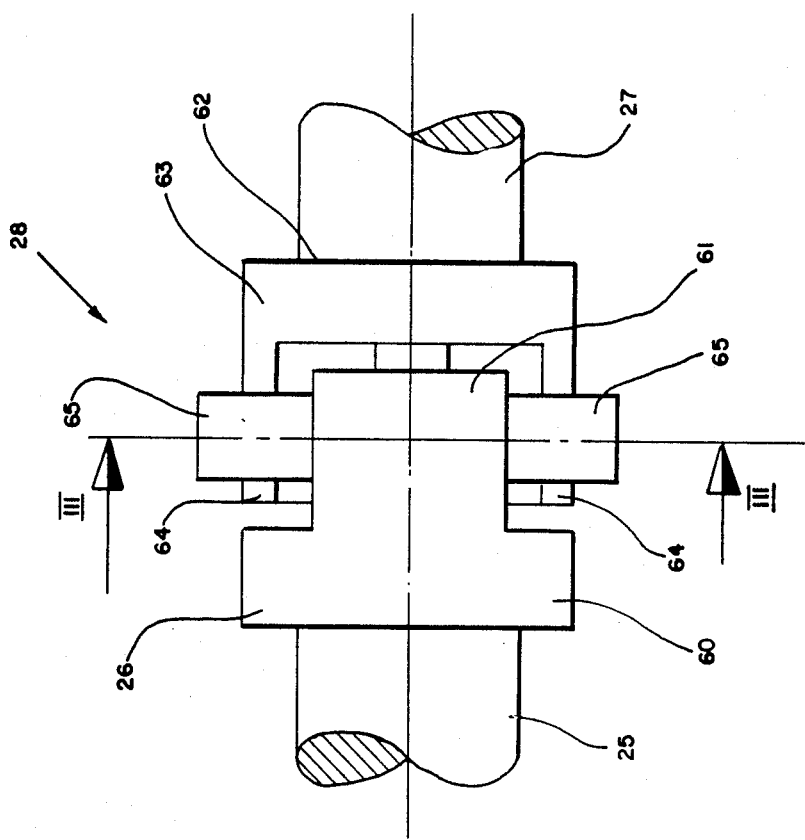
FIG. 6a is an enlarged side view of the coupling means in FIG. 2.

As shown more clearly in FIGS. 6a and 6b, the end 26 of the primary drive shaft 25 is formed having a boss 60 including a pair of laterally extending jaws 61. Similarily, the end 62 of the drive shaft 27 is formed having a boss 63 with a pair of laterally extending jaws 64 which locate in the recesses defined between the jaws 61. The jaws 64 each have an annular resilient rubber or plastics collar 65 located thereon, the collars 65 serving to minimise noise and vibration during starting, rotation and stopping of the drive shafts 25, 27.

Figure 4:
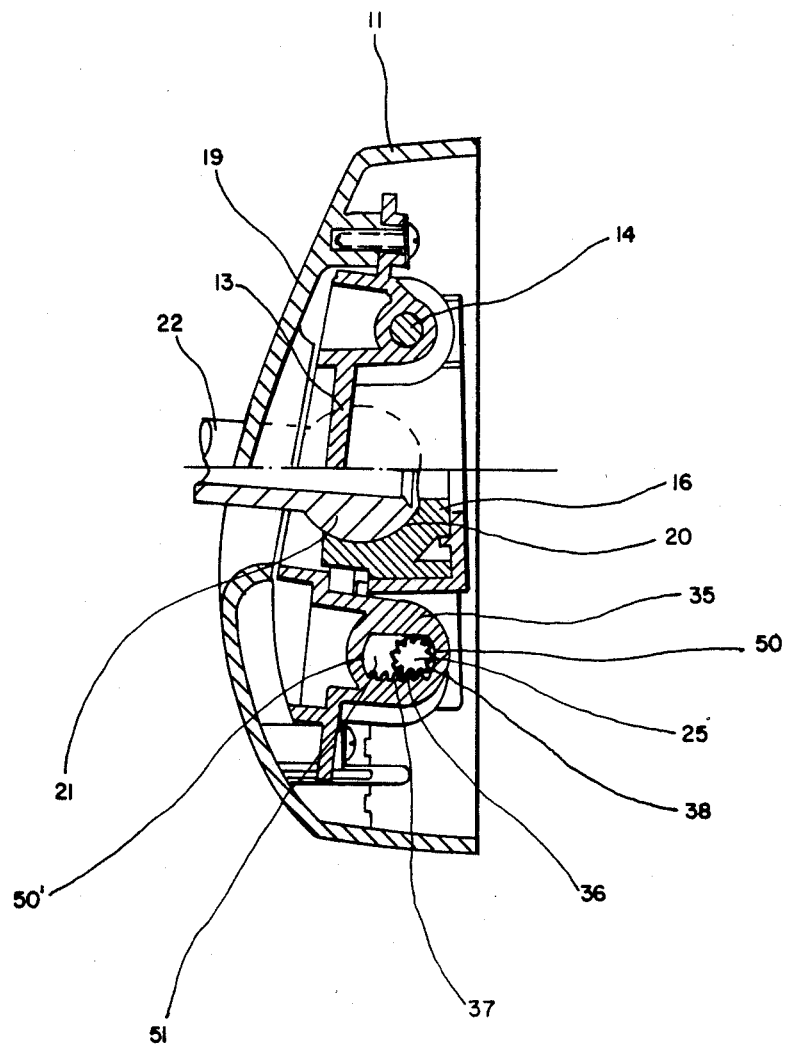
FIG. 4 is a cross-sectional view of the mirror assembly taken along the lines II—II in FIG. 2.

As shown more clearly in FIG. 4, the primary drive shaft 25 and flange 35 are coupled together in a rack and pinion actuation means as will now be described. The lower part 36 of the interior surface of the hollow flange 35 is formed having a plurality of gear teeth 37 which correspond to gear teeth 38 formed on the outer surface of the drive shaft 25 in the region of the flange 35. Thus, the primary drive shaft 25 and the support plate 13 are mechanically driveable relative to each other, by means of a rack and pinion arrangement.

A reversible d.c. electric motor 40 is secured to a flange 41 integrally formed with and projecting laterally outwardly from the mounting plate 16. The flange 41 has an arcuate outer surface 42 conforming to the shape of the motor body 43 and a conventional tie wrap 44 secures the motor 40 in place. The drive shaft (not shown) of the motor 40 drives a worm and wormwheel arrangement 45 with the secondary drive shaft 27 being connected to the wormwheel 46. Thus, when the electric motor 40 is energised, the worm and wormwheel arrangement 45 operates to rotate the wormwheel 46, causing the secondary drive shaft 27 to rotate and thus the primary drive shaft 25 also rotates. Any vibration or noise caused by the electric motor 40 is substantially isolated from the primary drive shaft 25 by means of the dog clutch 28 arrangement.

As the lugs 24, 24' are fixed to the mounting plate 16 and as the mounting plate 16 is fixed to the support arm 22, then rotation of the primary drive shaft 25 causes the support plate 13 and thus the casing 11 to pivot about the axis 17, with the gear teeth 38 on the primary drive shaft 25 causing a controlled pivotal movement by engaging with the gear teeth 37 on the flange 35.

Thus, in use the mounting plate 16 remains stationary relative to the mounting arm 22 and the motor vehicle in which the apparatus is fixed, and the support plate 13 and the casing 11 pivot about the axis 17 relative to the mounting plate 16. The end faces 50, 50' of the slot 51 in the flange 35 define the limits of pivotal movement of the casing 11 relative to the mounting plate 16, so that when the primary drive shaft 25 abuts the face 50, the mirror 12 is in the full reflectance or day mode and when the drive shaft abuts the face 50' the mirror 12 is in the partial reflectance or night mode.

A photocell(s) (not shown) is/are conveniently mounted on the mirror assembly and is/are connected via suitable circuitry (FIG. 8) to energise the reversible d.c. motor 40. Alternatively, or in addition, a manually operated switch (FIG. 8) may be located on the casing 11 or on or adjacent to the vehicle steering wheel for operation by the driver of the vehicle.

Figure 7:
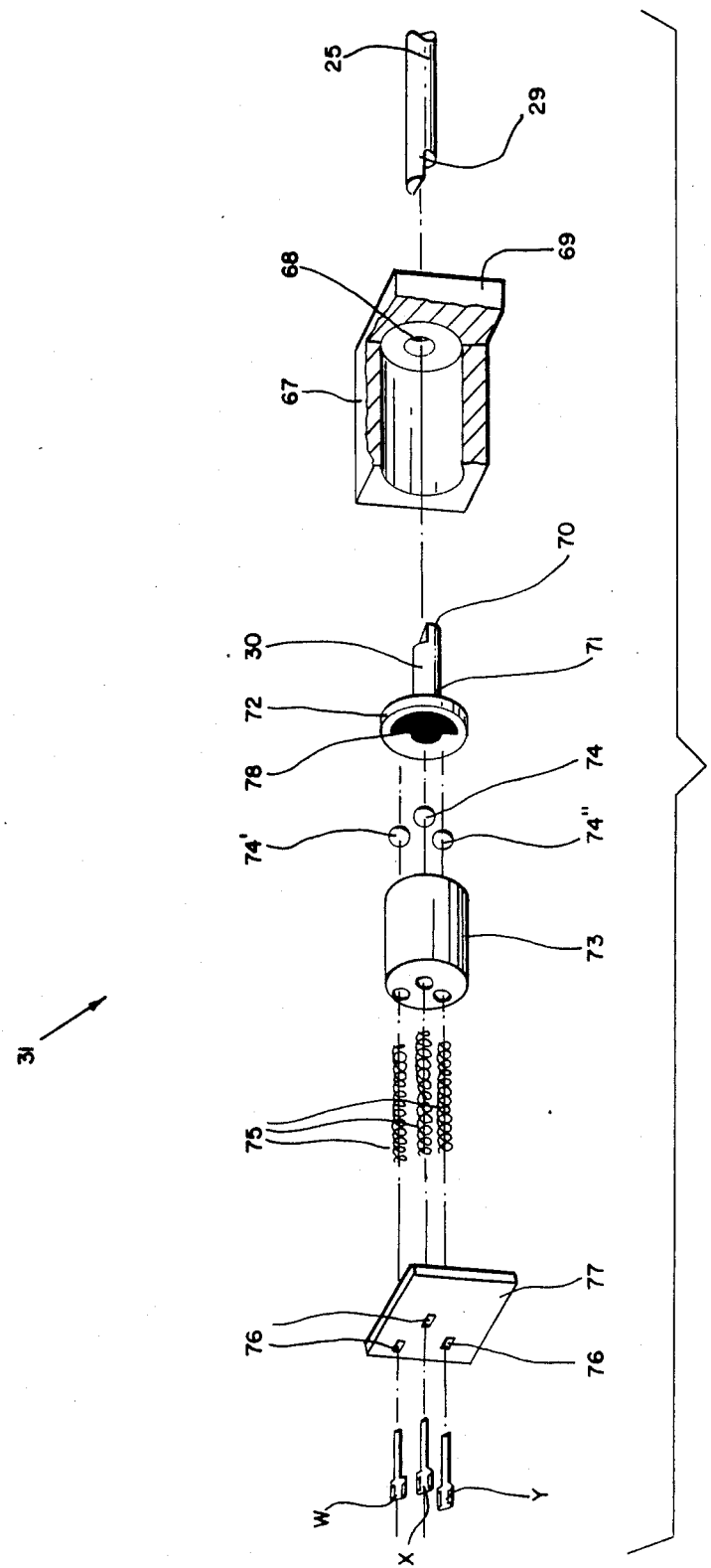
FIG. 7 is an exploded perspective view of the rotary switch of FIG. 2.

The rotary switch 31 is shown more clearly in FIG. 7 and comprises a hollow housing 67 having an aperture 68 in the forward wall 69 through which the end 70 of the operating shaft 30 projects. The end 29 of the primary drive shaft 25 is half-cylindrical in shape and mates with the end 70 (also half-cylindrical in shape), of the operating shaft 30 of the switch 31. The opposite end 71 of the shaft 30 has formed thereon a disc 72 which is partially accommodated in a support barrel 73. The barrel 73 also supports three angularly disposed ball contacts 74, 74',74" which are biassed towards the disc 72 by means of electrically conductive coil springs 75. The coil springs 75 are connected to electrical contacts W, X, Y, which project through apertures 76 in an end plate 77 of the housing 67. The disc 72 has fixed thereon an electrically conductive switch track 78 in the form of a semi-circular metal plate. The switch track 78 is permanently in contact with the central ball contact 74, corresponding to termnal X. A power supply provides power to terminals W and Y and the power is selectively supplied to motor 40 via terminal X and suitable circuitry. The control of the motor 40 is determined by the angular position of the switch track 78 which provides a bridging contact between ball contacts 74, 74' and 74", as will now be described.

As shown in FIG. 8, the control circuitry for the reversible d.c. motor 40 generally comprises a voltage regulator 80 providing an output of 5.6 V on lead 81 from the vehicle power supply—usually of 12 V. The motor 40 is connected between first and second comparator circuits 82 and 83 respectively, which are formed from an L272M integrated circuit. The lead 81 is connected to a potential divider comprising resistors R1 and R2 via the terminals W and Y of the rotary switch 31. The terminal X is connected to pin 7 of comparator circuit 82. Pin 8 of the comparator circuit 82 and pin 6 of comparator circuit 83 are connected to a voltage divider comprising resistors R3 and R4 with one end of R3 connected to line 81 and one end of R4 being grounded. Resistor R2 is also grounded. Thus, input voltages on pins 8 and 6 are the same. A voltage pulse is supplied to pin 5 of comparator circuit 83 by means of a momentary action switch 85 connected via circuitry 86. The circuitry 86 comprises an integrated circuit HC123 which provides anti-bounce of the signal pulse produced when the switch 85 is closed to provide a clean square wave pulse. In addition, a flip-flop in the form of integrated circuit HC74 is provided to change the state of the input to pin 5 each time the switch 85 is closed.

Alternatively, the voltage pulse to pin 5 can be supplied from a latch type push button or rocker switch 87 providing a voltage from a voltage divider 88. In this embodiment, output pin P of voltage divider 88 is connected to pin Q. The output pins 1 and 3 from the comparator circuits 82, 83 respectively are connected to the motor 40. A capacitor C1 connected across the motor 40 provides noise suppression and an LED D1 provides a light source to indicate when the mirror is in the night position. Pin 2 of comparator circuit 82 is connected to lead 81 and pin 4 of comparator circuit 83 is grounded to provide the power supply for the integrated circuit.

In the night position of the mirror 12 the output on pin 1 of comparator circuit 82 is low and the output on pin 3 of comparator circuit 83 is low thus, the motor 40 is not energised. Similarly, in the day position of the mirror 12, the output on pin 1 of comparator circuit 82 is high and the output on pin 3 of comparator circuit 83 is high and once again the motor 40 is not energised. In the night position of the mirror 12 the switch track 78 of the rotary switch 31 is connected to pin Y and thus X and Y being connected together the input to pin 7 is low. Similarly, in the day position of the mirror 12 the switch track 78 is connected to pin W and thus W and X being connected together, the input to pin 7 is high. To move the mirror from the night to the day position, switch 85 or 87 is closed to provide an input voltage pulse to pin 5. This changes the output on pin 3 from low to high which thus energises the motor 40 to pivot the mirror 12 to the day position. Thus, with the output on pin 3 high and the output on pin 1 low the motor 40 is energised to move the mirror to the day position.

Thus, as the primary drive shaft 25 rotates from the night position, the operating shaft 30 rotates and the switch track 78 rotates until it bridges contacts W and X thus providing a high input signal to pin 7. This changes the output on pin 1 of the comparator circuit 82 from low to high thus switching off the motor 40 which stops in the day position. When either the switch 85 or 87 is again operated the output signal level on pin 3 changes from high to low, thus energising the motor 40 again to move the mirror to the night position in which the switch track 78 once again bridges contacts X and Y. The input to pin 5 of comparator circuit 83 can thus be regarded as a signal supply means for changing the reflectance mode of the mirror. It will be noted that in the night position the diode D1 is forward biassed so that it is energised to provide an indicator of the mode of the mirror.

Figure 9B:
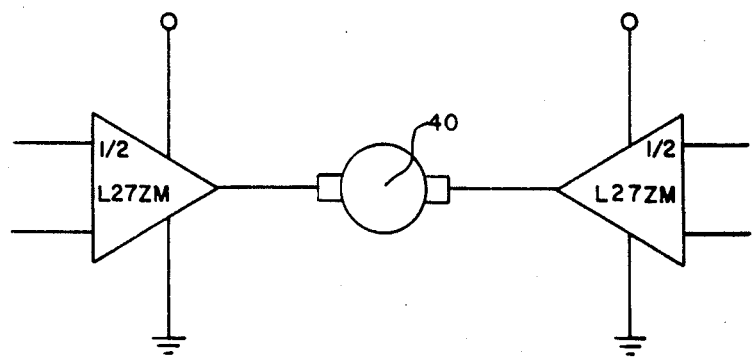
FIGS. 9a and 9b illustrate braking circuits for the drive means of FIG. 2.
Figure 9A:
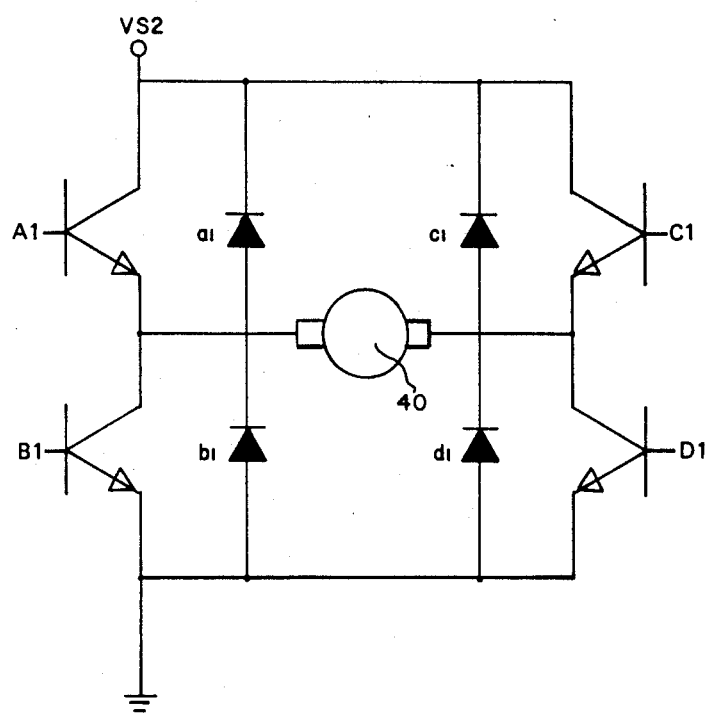
Figure 10:
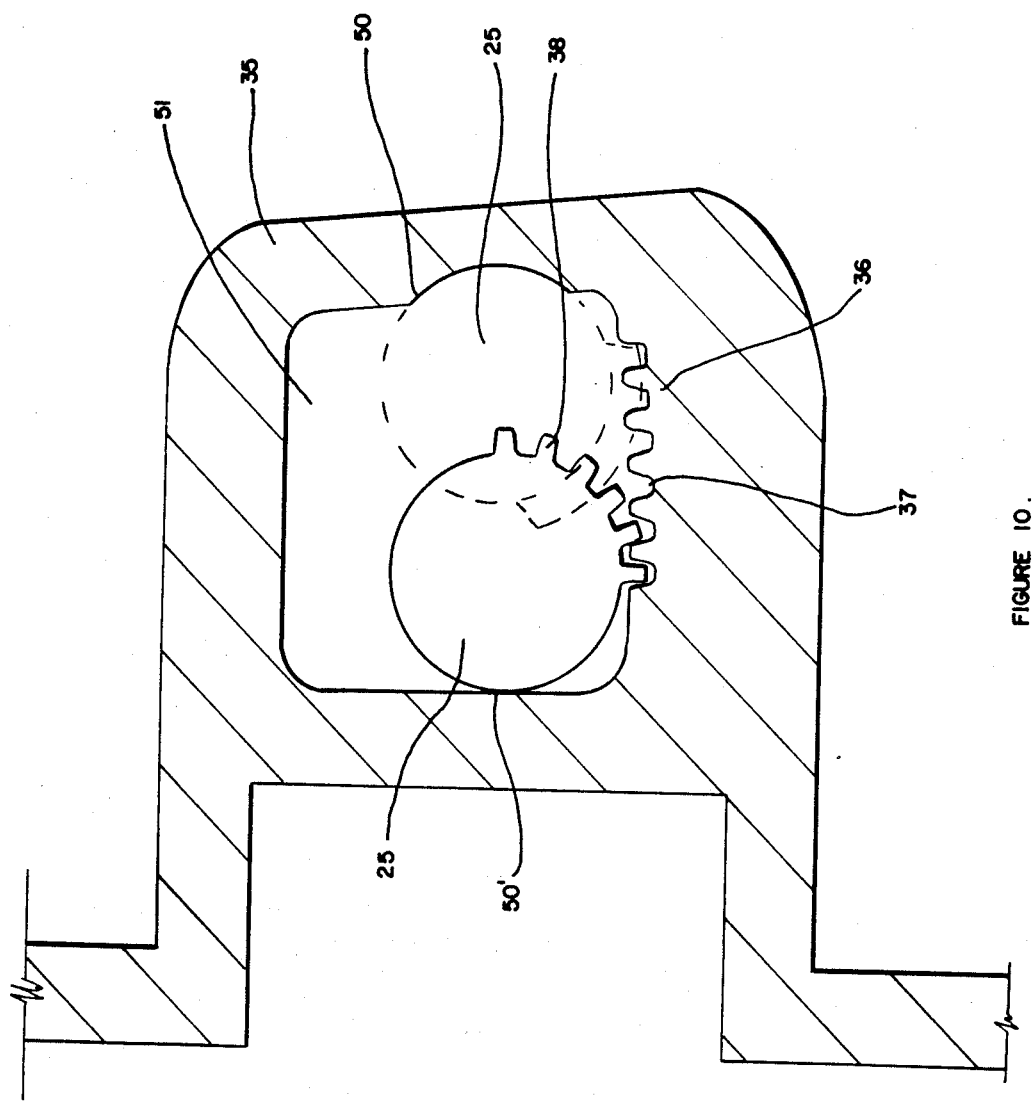
FIG. 10 is an enlarged cross-sectional view of the primary drive shaft and hollow flange of the support plate of FIG. 2.

As shown in more detail in FIGS. 9a and 9b, the circuitry in the L272M integrated circuit is configured to provide a braking means to rapidly stop the electric motor 40 in either the day or night position of the mirror 12. The circuit of FIG. 9b illustrates the equivalent functional circuit of that shown in more detail in FIG. 9a. The motor 40 is arranged in a H-shaped bridge of four transistors A1 to D1 and corresponding diodes a1 to d1. As the motor runs from the night to the day position the transistors C1 and B1 are turned on and current flows through the motor 40 from transistor C1 to transistor B1. However, as the mirror 12 moves to the day position transistor B1 turns off and transistor A1 turns on. Transistor A1 is, however, reverse biassed relative to current flow from transistor C1, however, diode a1 is forward biassed thus shorting the motor 40 between transistor C1 and diode a1. This provides dynamic braking of the motor 40 resulting in rapid stopping of the motor and accurate positioning of the mirror 12 in the day position.

Similarly, to reverse the motor direction and return the mirror 12 to the night position transistor D1 is turned on and current flows through the motor from transistor A1 to transistor D1. As the mirror 12 moves to the night position, transistor B1 is turned on and diode b1 is forward biassed thus shorting the motor between diode b1 and transistor D1 to once again provide rapid dynamic braking of the motor 40.

Thus, in operation of the assembly 10, the prism mirror plate 12 and housing 11 are pivoted between a full reflectance (day) mode and a partial reflectance (night) mode during rotation of the primary drive shaft 25. The mirror plate 12 is normally in the full reflectance mode, however, during travel in darkness, the headlights of a following vehicle shine via the mirror plate 12 into the driver's eyes and the electric motor 40 cause rotation of the drive shaft 25 to move the mirror 12 to the partial reflectance or night mode.

Figure 5:
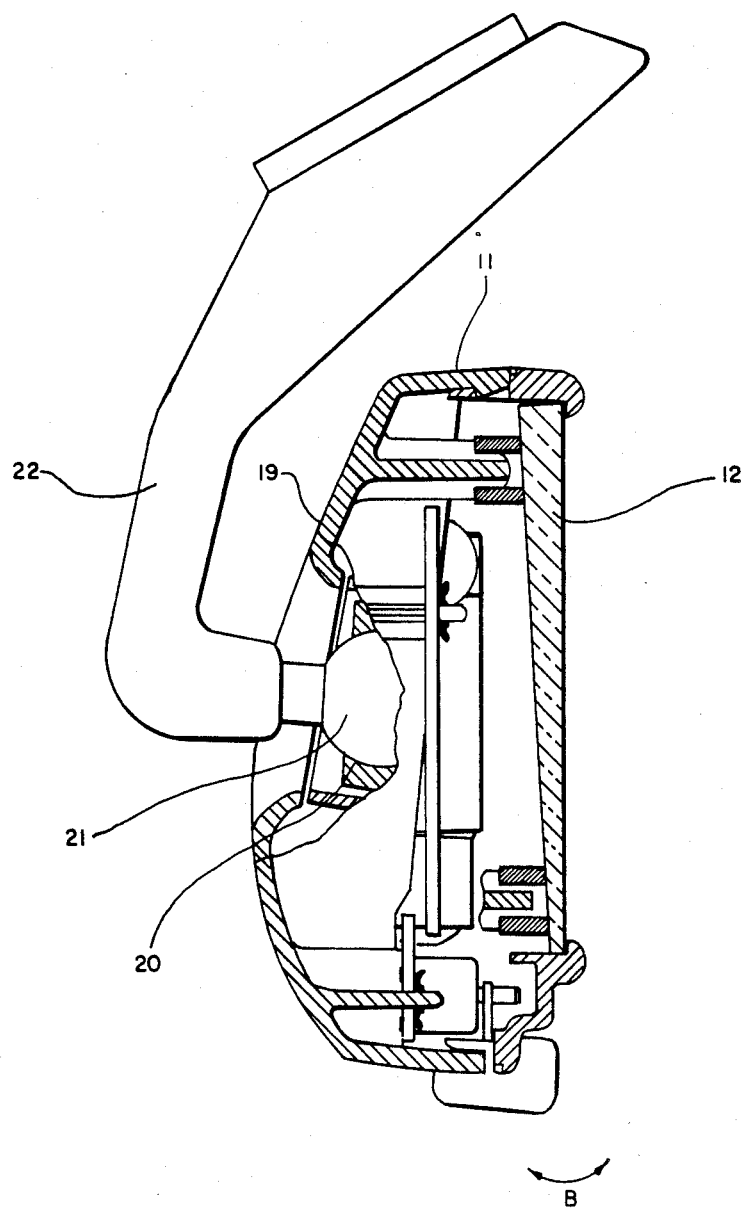
FIG. 5 is a general cross-sectional view of the mirror assembly of FIG. 1.

In the embodiment of the invention which incorporates a photocell circuit, the motor 40 is automatically energised by a signal from the photocell circuit and the worm and wormwheel arrangement 45 is operated causing the secondary 27 and primary 25 drive shafts to rotate and pivot the casing 11 and prism mirror 12 to the partial reflectance or night position. The mirror 12 and housing 11 pivot about the axis 17 in the direction of arrow B in FIG. 5. When the light level being detected by the photocell reduces below a predetermined level, the motor 40 is again energised but operates this time in the reverse direction to return the casing 11 and prism mirror 12 to the full reflectance day position.

Similarly, if the apparatus is being controlled by a manual switch, the driver of the vehicle simply operates the switch to energise the motor as required to pivot the casing 11 and mirror plate 12 between the desired full reflectance (day) and partial reflectance (night) positions.

The gearing ratios of the worm and wormwheel 45 and the gear teeth 37, 38 together with the motor 40 are selected to provide a speed of operation of movement of the mirror 12 between the day and night position and vice versa of preferably less than one second and more preferably in the range ¼ to ½ seconds.

Figure 11:
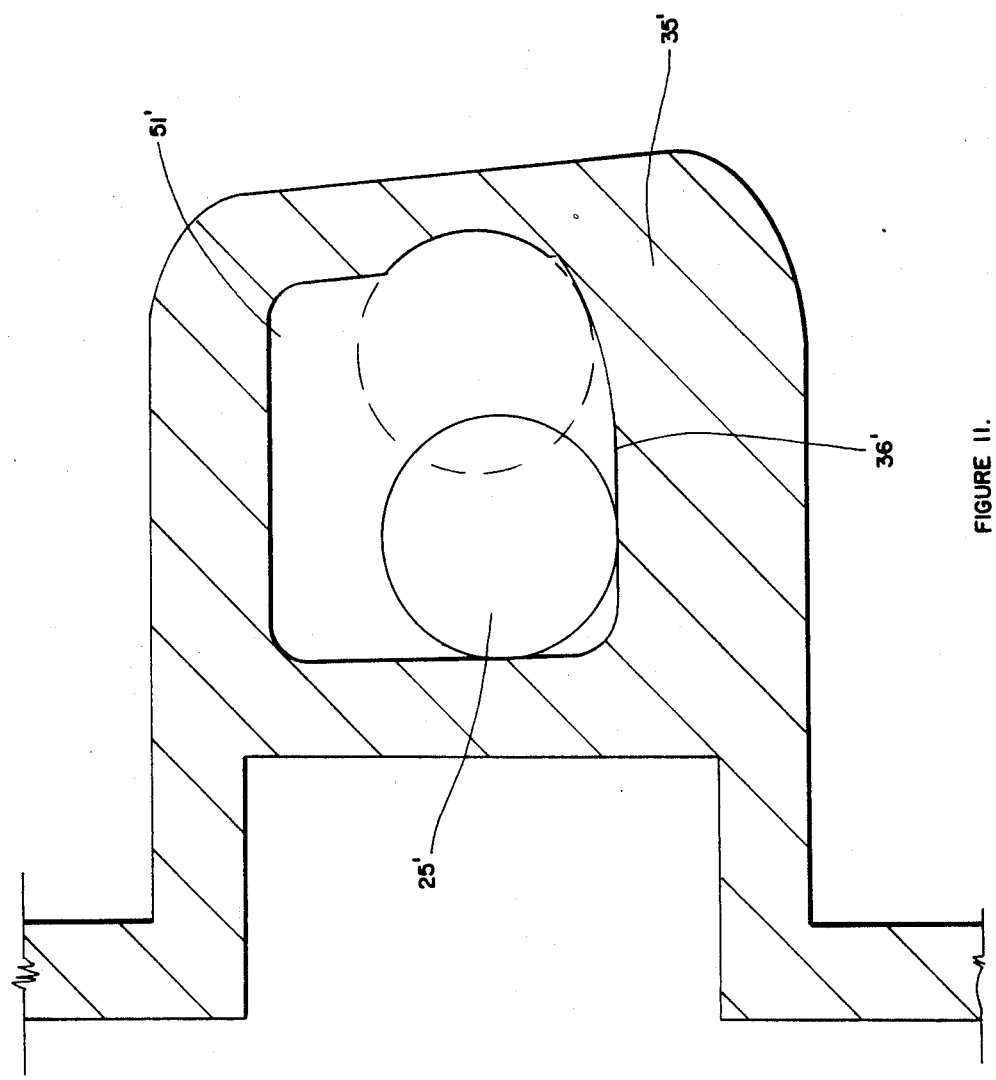
FIG. 11 is a cross-sectional view of another embodiment of actuation means.

In another embodiment of the invention as shown in FIG. 11, the primary drive shaft 25' and the surface 36' of the flange 35' defining the slot 51', are frictionally coupled together to drive the support plate 13 relative to the mounting plate 16. Therefore, as shown in FIG. 6, the primary drive shaft 25' and the surface 36' of the flange 35 does not have the gear teeth shown in the previous embodiment of the invention. The essential characteristic of both embodiments of the invention is that there is provided concentric actuation means for moving the support plate 13 and thus the casing 11 and mirror 12 relative to the mounting plate 16.

Figure 12:
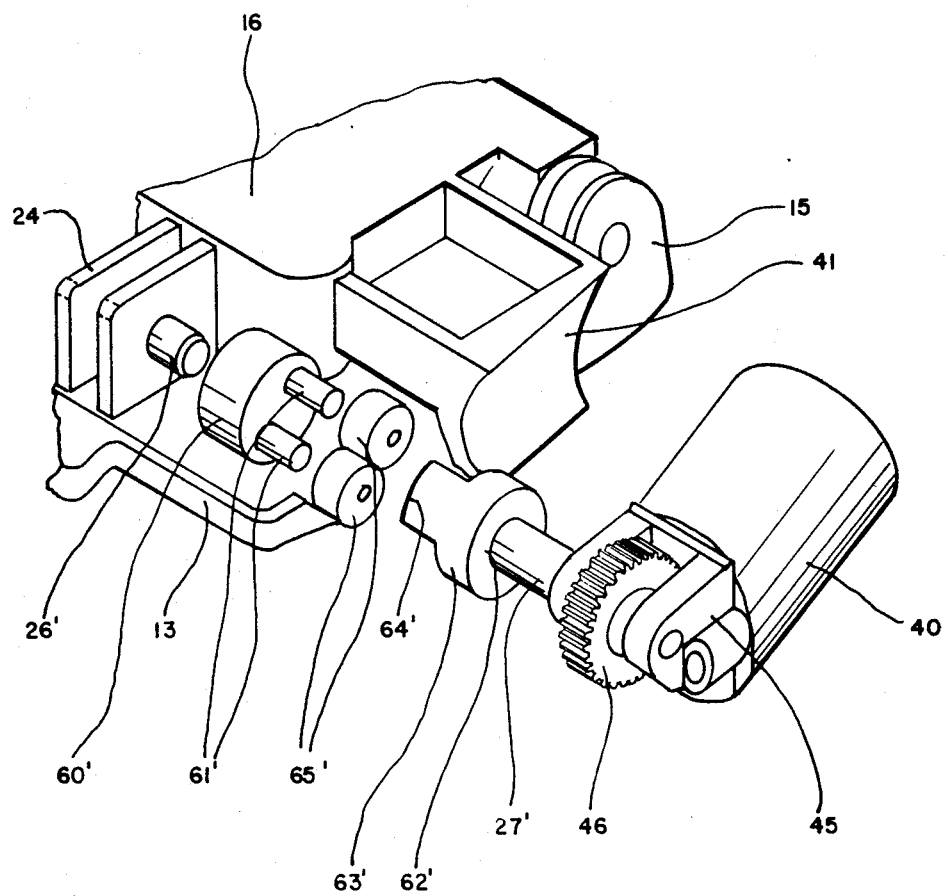
FIG. 12 is an exploded perspective view of a second embodiment of drive coupling according to the invention.

Referring now to FIG. 12 there is shown another embodiment of a coupling between the primary and secondary drive shafts 25', 27' respectively. As shown, the end 26' of the primary drive shaft 25' has fixed thereon a cylindrical boss 60'. The boss 60' has a suitable cylindrical recess (not shown) in the surface facing the end 26' of the drive shaft 25', the end 26' being an interference fit in the recess. The boss 60' has a pair of laterally extending cylindrical projections 61' each of which receives thereon a resilient rubber or plastics collar 65'.

The end 62' of the secondary drive shaft 27' is formed having a boss 63' with a pair of suitably shaped laterally extending jaws 64' which locate in the recesses defined between the rubber collars 65'. The collars 65' serve to minimise noise and vibration during starting, rotation and stopping of the drive shafts 25, 27.

Figure 13:
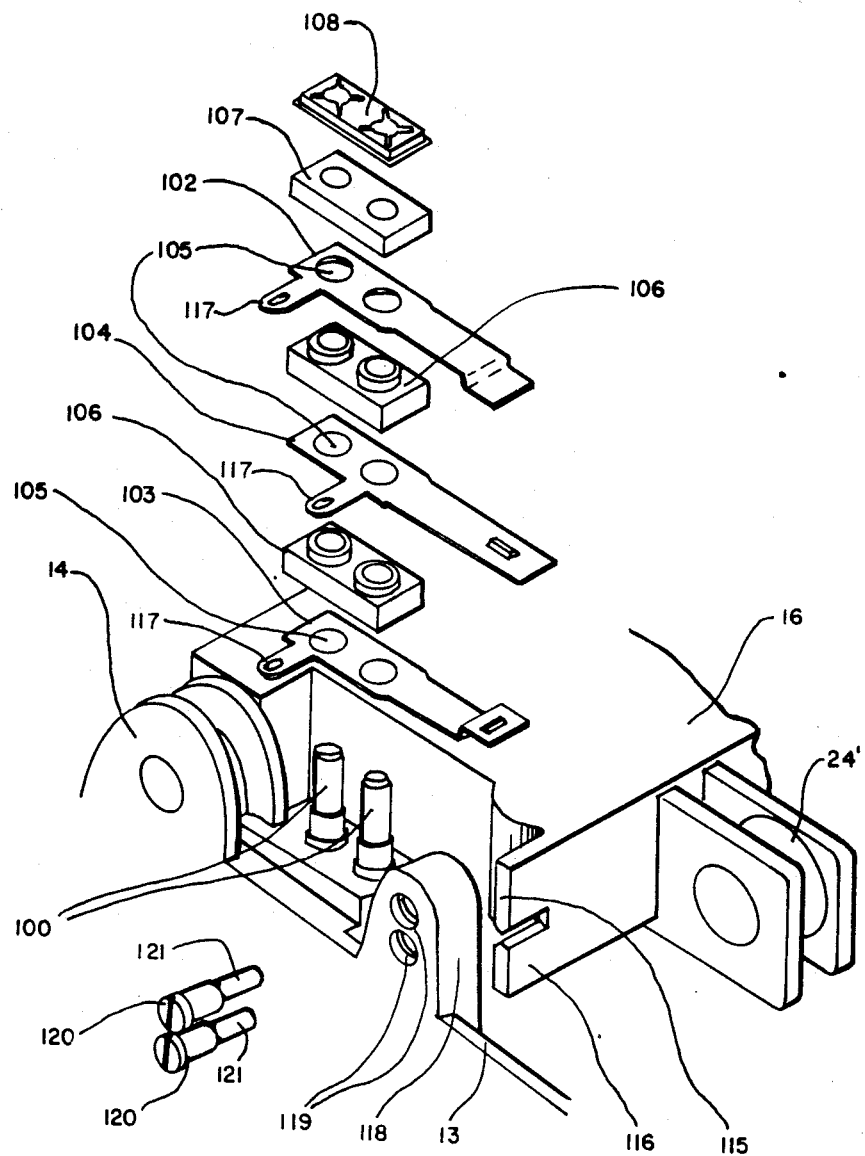
FIG. 13 is a partial perspective view of the mounting plate and support plate together with an exploded view of a leaf switch according to the invention.
Figure 14:
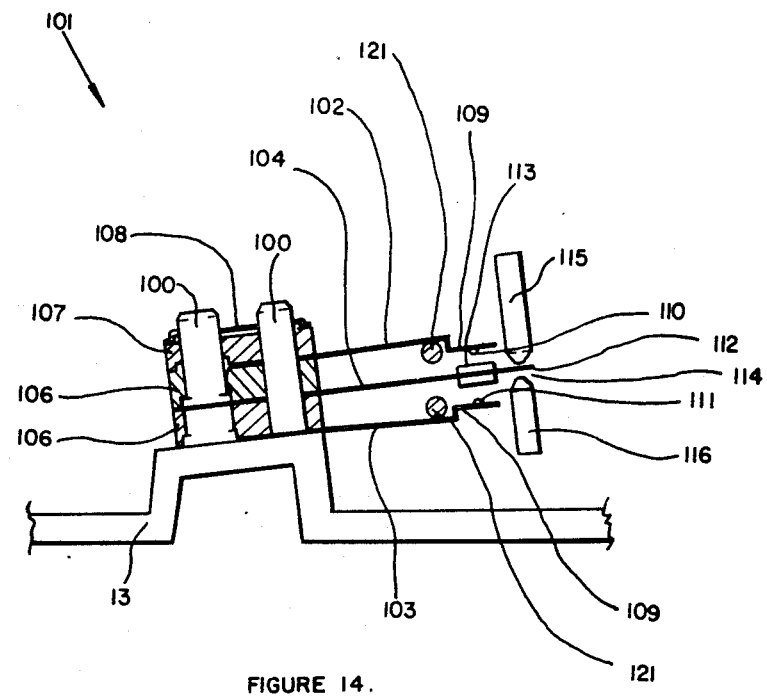
FIG. 14 is a cross-sectional view of the leaf switch of FIG. 13.

In FIGS. 13 and 14 there is shown another embodiment of switch and control arrangement for controlling operation of the reversible d.c. motor 40. As shown, the support plate 13 has a pair of upwardly projecting lugs 100 fixed thereto. The lugs 100 carry a form of three part leaf switch 101 as will now be described. The switch 101 comprises upper, lower and common switching members 102, 103 and 104 respectively. The switching members have suitable apertures 105 to enable them to be located on the lugs 100. Suitable spacing members 106 are also located on the lugs 100 to space apart the upper and lower switching members 102, 103 from the common switching member 104. A clamping plate 107 and spring clip 108 are located on the lugs 100 to secure the switch assembly 101 in place. The free ends 109 of the upper and lower switch members 102, 103 are bent towards the common switch member 104. The surface of each of the upper and lower switch members 102, 103 adjacent to the common switch member 104 carry an electrical contact 110, 111 respectively. Similarly, the end 112 of the common switch member 104 has an electrical contact 113 on both surfaces adjacent to the contacts 110, 111. The free end 112 of the common switch member 104 projects through a slot 114 defined between a pair of flanges 115, 116 extending from the mounting plate 16.

In use therefore, as the support plate 13 and the casing 11 move relative to the mounting plate 16, the common switch member 104 is held in position by the flanges 115, 116 allowing the electrical contacts 110, 111 in turn to contact the electrical contact 113 on the common switch member 104. This enables the reversible d.c. motor 40 to be controlled in a manner similar to that previously described in relation to the rotary switch 31. Each of the switch members 102, 103, 104 has a flange portion 117 which are connected in the circuitry of FIG. 8a in substitution for the rotary switch 31.

Thus, the common switch member 104 represents the contact X in FIG. 8a and the upper and lower switch members 102, 103 represent the electrical contacts W and Y in FIG. 8a.

The mounting plate 16 also has an upstanding boss 118 having a pair of apertures 119 each of which accommodates a rotatable adjusting pin 120. The end portion of each adjusting pin 120 comprises an eccentric cam 121. As shown more clearly in FIG. 14 as each of the adjusting pins 120 is rotated, the eccentric cam portions 121 act against the respective switch member 102, 103 and the distance between the electrical contacts 110, 111 and the electrical contact 113 can be adjusted. This varies the time period for starting and stopping of the electric motor 40, and thus adjusts the positioning of the mirror in the day and night position.

The primary advantages of the invention are as follows. The end faces 50, 50' of the slot 51 together with the bi-directional motor 40 define positive maximum limits for movement of the mirror to the day or night positions and thus prevent over-run. The dog clutch type connection provides a positive drive for the primary drive shaft 25 and effectively isolates vibration and noise from the primary drive shaft. The rotary and leaf switches minimise noise.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A vehicle rearview mirror assembly comprising, a casing, a mirror plate fixed on said casing, the mirror plate having a full reflectance mode and a partial reflectance mode, a mounting means disposed within said casing, means pivotally connecting the casing and the mounting means for pivotal movement of the casing and mirror plate as a unit relative to the mounting means, a rack and pinion actuation means coupling the casing to the mounting means, said rack and pinion actuation means including a rotatable shaft for engaging a portion of said casing and means for limiting pivotal movement of said casing relative to said mounting means, drive means including electric motor means for operating said rotatable shaft to pivot the casing and mirror plate as a unit between the full reflectance mode and partial reflectance mode relative to said mounting means.

2. A rearview mirror assembly as claimed in claim 1, wherein the electric motor means comprises a reversible d.c. motor.

3. A rearview mirror assembly as claimed in claim 2, wherein said reversible d.c. motor is attached to said mounting means.

4. A rearview mirror assembly as claimed in claim 2, wherein there is provided electric circuit means for energising said reversible d.c. motor, the electric circuit means including switch means for deenergising the electric motor in the full reflectance and partial reflectance modes of the mirror.

5. A rearview mirror assembly as claimed in claim 4, wherein the switch means comprises a leaf switch.

6. A rearview mirror assembly as claimed in claim 5, wherein the leaf switch is attached to the mirror casing and has a common switching member the free end of which is held in position by the mounting means, such that movement of the mirror casing enables the common switching member to open and close a circuit between the common switching member and upper and lower switching members disposed on either side of the common switching member to control operation of the reversible d.c. motor.

7. A rearview mirror assembly as claimed in claim 6, wherein the leaf switch is mounted on a pair of spaced apart lugs fixed to a support plate which is mounted on the mirror casing.

8. A rearview mirror assembly as claimed in claim 6, wherein the free end of the common switching member is retained in a slot defined between a pair of flanges extending from the mounting means.

9. A rearview mirror assembly as claimed in claim 6, wherein there is provided means for adjusting the distance between the common switching member and the upper and lower switching members.

10. A rearview mirror assembly as claimed in claim 9, wherein the adjusting means comprises a pair of rotatable adjusting pins each having a cam surface which abuts a respective one of said upper and lower switching members.

11. A rearview mirror assembly as claimed in claim 4, wherein the reversible d.c. motor is connected between first and second comparator circuits.

12. A rearview mirror assembly as claimed in claim 11, wherein one input of each comparator circuit is connected to a common reference voltage, a second input to the first comparator circuit is connected to the switch means for deenergising the electric motor, and a second input to the second comparator circuit is connected to a signal supply means for changing the reflectance mode of the mirror.

13. A rearview mirror assembly as claimed in claim 12, wherein the signal supply means comprises a momentary action switch which provides a signal to the second comparator circuit via anti-bounce circuitry and a flip flop.

14. A rearview mirror as claimed in claim 11, wherein the comparator circuits are configured to provide dynamic braking of the reversible d.c. motor in the full reflectance and partial reflectance modes of the mirror.

15. A rearview mirror assembly as claimed in claim 12, wherein the signal supply means comprises circuit means for automatically indicating the reflectance mode of the mirror.

16. A vehicle rearview mirror assembly comprising, a casing, a mirror plate fixed on said casing, the mirror plate having a full reflectance mode and a partial reflectance mode, a mounting means disposed within said casing, means pivotally connecting the casing and the mounting means for pivotal movement of the casing and mirror plate as a unit relative to the mounting means, a rack and pinion actuation means coupling the casing to the mounting means, drive means including electric motor means for operating the actuation means to pivot the casing and mirror plate as a unit between the full reflectance mode and partial reflectance mode relative to said mounting means; said electric motor means including a reversible d.c. motor; said rack and pinion actuation means including a primary drive shaft cooperating with lugs on the mounting means, the primary drive shaft having first gear teeth means meshing with corresponding second gear teeth means on a flange attached to the casing.

17. A rearview mirror assembly as claimed in claim 16, wherein the flange defines a slot having said second gear teeth means, said slot having end walls which determine the limits of pivotal movement of the casing relative to the mounting means.

18. A rearview mirror assembly as claimed in claim 16, wherein there is provided coupling means connecting said primary drive shaft to a secondary drive shaft, said secondary drive shaft being connected to the reversible d.c. motor.

19. A rearview mirror assembly as claimed in claim 18, wherein said coupling means includes vibration and noise reduction means.

20. A rearview mirror assembly as claimed in claim 18, wherein said coupling means comprises complementary engaging jaws on the adjacent ends of said primary and secondary drive shaft.

21. A rearview mirror assembly as claimed in claim 20, wherein the jaws on the secondary drive shaft are separated from the jaws on the primary drive shaft by means of a resilient collar.

22. A rearview mirror assembly as claimed in claim 18, wherein the coupling means comprises a pair of cylindrical projections extending from the primary drive shaft, said cylindrical projections engaging with complementary jaws extending from the secondary drive shaft.

23. A rearview mirror assembly as claimed in claim 22, wherein a resilient collar is located on each of said projections.

24. A rearview mirror assembly as claimed in claim 18, wherein said secondary drive shaft is connected via a worm and wormwheel drive means, to said reversible d.c. motor.

25. A vehicle rearview mirror assembly comprising, a casing, a mirror plate fixed on said casing, the mirror plate having a full reflectance mode and a partial reflectance mode, a mounting means disposed within said casing, means pivotally connecting the casing and the mounting means for pivotal movement of the casing and mirror plate as a unit relative to the mounting means, a rack and pinion actuation means coupling the casing to the mounting means, drive means including electric motor means for operating the actuation means to pivot the casing and mirror plate as a unit between the full reflectance mode and partial reflectance mode relative to said mounting means; said electric motor means including a reversible d.c. motor; electric circuit means for energising said reversible d.c. motor, said electric circuit means including switch means for deenergising said electric motor in the full reflectance and partial reflectance modes of the mirror; said switch means including a rotary switch connected to said primary drive shaft.

26. A vehicle rearview mirror assembly comprising:
a casing;
a mirror fixed on said casing, said mirror having a full reflectance mode and a partial reflectance mode;
mounting means disposed within said casing;
means for pivotally connecting said casing and said mounting means for pivotal movement of said casing and said mirror as a unit relative to said mounting means;
actuation means coupling said casing to said mounting means;
electric drive means for operating said actuation means to pivot said casing and mirror as a unit between said full and said partial reflectance modes relative to said mounting means;
said actuation means including primary and secondary drive shafts rotatably mounted in axial alignment with one another on said mounting means, said secondary drive shaft also being coupled to said electric drive means, said primary drive shaft including means for engaging a portion of said casing to pivot said casing and mirror as a unit, and resilient coupling means for connecting said secondary drive shaft to said primary drive shaft while reducing vibration and noise during operation by said electric drive means.

27. The rearview mirror assembly of 26 wherein said coupling means comprises complementary engaging jaws on the adjacent ends of said primary and secondary drive shafts.

28. The rearview mirror assembly of claim 27 wherein said jaws on said secondary drive shaft are separated from said jaws on the primary drive shaft by means of a resilient collar.

29. The rearview mirror assembly of claim 26 wherein said coupling means includes a pair of cylindrical projections extending from said primary drive shaft, said cylindrical projections engaging with complementary jaws extending from said secondary drive shaft.

30. The rearview mirror assembly of claim 29 wherein a resilient collar is located on each of said cylindrical projections.

31. A vehicle rearview mirror assembly comprising;
a casing;
a mirror fixed on said casing, said mirror having a full reflectance mode and a partial reflectance mode;
mounting means disposed within said casing;
means for pivotally connecting said casing and said mounting means for pivotal movement of said casing and said mirror as a unit relative to said mounting means;
actuation means coupling said casing to said mounting means;
electric drive means for operating said actuation means to pivot said casing and mirror as a unit between said full reflectance mode and said partial reflectance mode relative to said mounting means;
said actuation means including a primary drive shaft rotatably mounted on said mounting means and coupled to said electric drive means; said electric drive means including a rotary switch connected to said primary drive shaft for deenergising said electric drive means in said full and partial reflectance modes.

32. A vehicle rearview mirror assembly comprising;
a casing;
a mirror fixed on said casing, said mirror having a full reflectance mode and a partial reflectance mode;
mounting means disposed within said casing;
means for pivotally connecting said casing and said mounting means for pivotal movement of said casing and said mirror as a unit relative to said mounting means;
actuation means coupling said casing to said mounting means;
electric drive means for operating said actuation means to pivot said casing and mirror as a unit between said full reflectance mode and said partial reflectance mode relative to said mounting means;
said electric drive means including a leaf switch mounted on said casing; said mounting means including abutment means engaging and maintaining a portion of said leaf switch in position for electrical contact by other portions of said leaf switch for deenergising said electric drive means in said full and partial reflectance modes.

33. The rearview mirror assembly of claim 32 wherein said leaf switch portion includes a common switching member having a free end which is held in position by said abutment means; said other portions of said leaf switch including upper and lower switching members disposed on either side of said common switching member; whereby movement of said casing enables said common switching member to open and close a circuit between said common switching member and said upper and lower switching members to control operation of the reversible d.c. motor.

34. The rearview mirror assembly of claim 33 wherein said leaf switch is mounted on a pair of spaced apart lugs fixed to a support plate which is mounted on said casing.

35. The rearview mirror assembly of claim 33 wherein said abutment means include a slot defined between a pair of flanges extending from said mounting means; said free end of said common switching member being retained in said slot.

36. The rearview mirror assembly of claim 33 including adjusting means for adjusting the distance between said common switching member and said upper and lower switching members.

37. The rearview mirror assembly of claim 36 wherein said adjusting means includes a pair of rotatable adjusting pins each having a cam surface which abuts a respective one of said upper and lower switching members.

38. A vehicle rearview mirror assembly comprising:
a casing;
a mirror fixed on said casing, said mirror having a full reflectance mode and a partial reflectance mode;
mounting means disposed within said casing;
means for pivotally connecting said casing and said mounting means for pivotal movement of said casing and said mirror as a unit relative to said mounting means;
actuation means coupling said casing to said mounting means;
drive means including electric motor means for operating said actuation means to pivot said casing and mirror as a unit between said full reflectance mode and said partial reflectance mode relative to said mounting means;
said electric motor means including a reversible d.c. motor and electric circuit means for energising said motor, said electric circuit means including switch means for deenergising said motor in said full reflectance and said partial reflectance modes; said motor being connected between first and second comparator circuits; one input of each comparator circuit being connected to a common reference voltage, a second input to said first comparator circuit being connected to said switch means for deenergising said electric motor, and a second input of said second comparator circuit being connected to a signal supply means for changing the reflectance mode of said mirror.

39. The rearview mirror assembly of claim 38 wherein said signal supply means includes a momentary action switch which provides a signal to the second comparator circuit via anti-bounce circuitry and a flip flop.

40. The rearview mirror of claim 38 wherein said comparator circuits are configured to provide dynamic braking of the reversible d.c. motor in the full reflectance and partial reflectance modes of said mirror.

41. The rearview mirror assembly of claim 38 wherein said signal supply means includes circuit means for automatically indicating the reflectance mode of the mirror.

* * * * *

UNITED STATES PATENT AND TRADEMARK OFFICE
CERTIFICATE OF CORRECTION

PATENT NO.  : 4,948,242

DATED       : August 14, 1990

INVENTOR(S) : John P. Desmond et al

It is certified that error appears in the above-identified patent and that said Letters Patent is hereby corrected as shown below:

On the title page item [75] Inventors: "Parick J. Lawlor" should read --Patrick J. Lawlor--.

Signed and Sealed this

Seventh Day of April, 1992

Attest:

HARRY F. MANBECK, JR.

Attesting Officer

Commissioner of Patents and Trademarks